Patented May 26, 1931

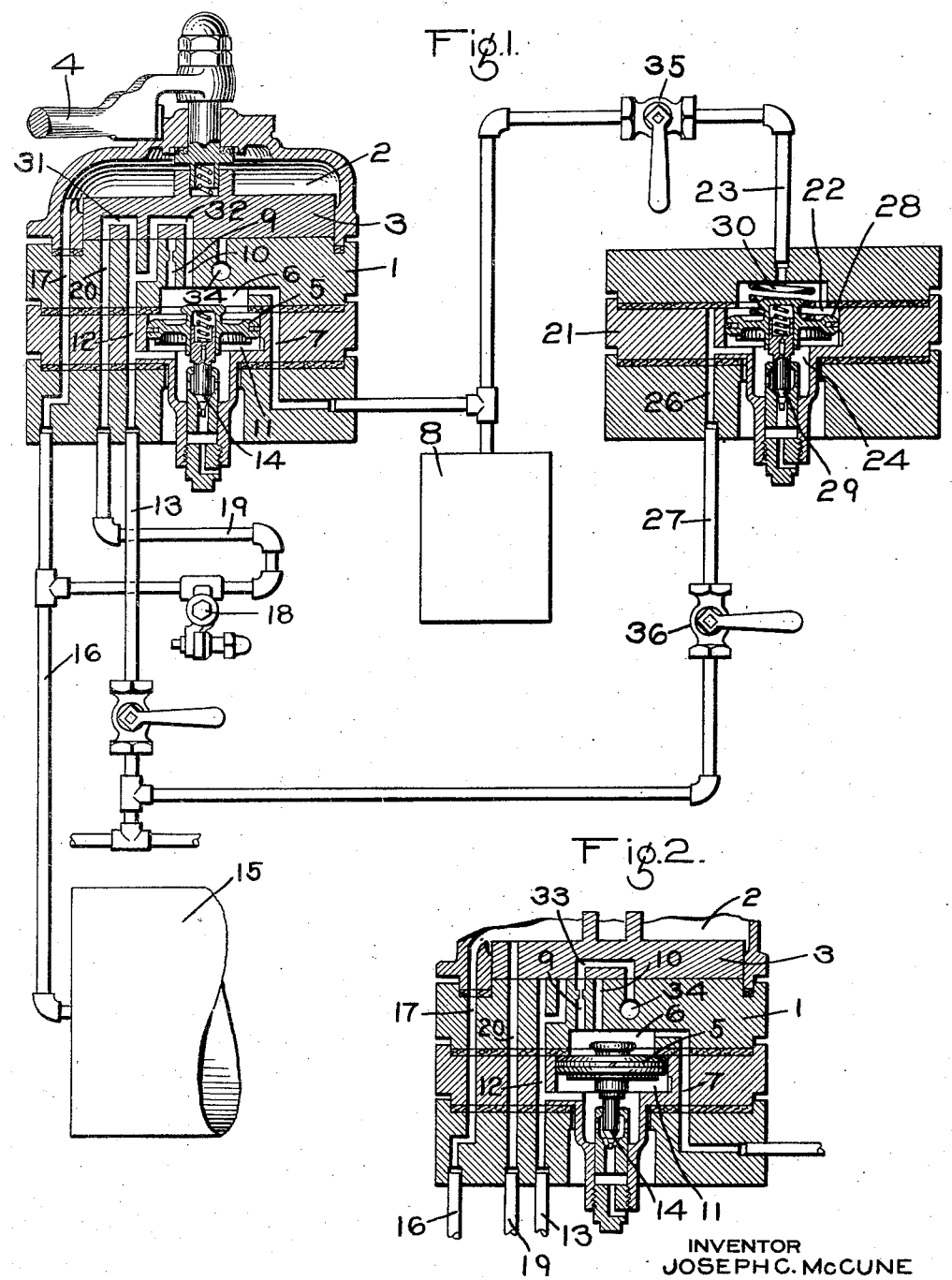

1,807,319

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE VALVE DEVICE

Application filed February 8, 1930. Serial No. 426,892.

This invention relates to fluid pressure brakes, and more particularly to means for controlling the venting of fluid under pressure from the brake pipe of an automatic fluid pressure brake system in effecting an application of the brakes.

The automatic fluid pressure brake system in common use for controlling the brakes on railway trains includes an engineer's brake valve device and an equalizing discharge valve mechanism for controlling the discharge of fluid from the brake pipe to effect a reduction in brake pipe pressure, so as to cause a service application of the brakes to be initiated.

The principal object of my invention is to provide an improved equalizing discharge valve means which will provide for a rapid rate of reduction in brake pipe pressure and which will respond promptly to a reduction in equalizing reservoir pressure, while at the same time the gradual closing characteristics of the usual equalizing discharge valve mechanism are retained, so that surges in brake pipe pressure are prevented.

In the accompanying drawings; Fig. 1 is a diagrammatic view, partly in section, of a fluid pressure brake apparatus embodying my invention; and Fig. 2 a sectional view of the brake valve device, showing the parts in service application position.

The brake valve device shown in the drawings may be of the usual construction comprising a casing 1 having a valve chamber 2 containing a rotary valve 3, adapted to be operated by a handle 4. Mounted in the casing in an equalizing discharge valve mechanism comprising a piston 5 having the chamber 6 at one side connected through passage 7 with the usual equalizing reservoir 8, said chamber having passages 9 and 10 leading to the seat of the valve 3.

The chamber 11 at the opposite side of the piston is connected to passage 12 which communicates with the usual brake pipe 13. The piston 5 is adapted to operate a discharge valve 14 for venting fluid from chamber 11 and the brake pipe to the atmosphere. The valve chamber 2 is supplied with fluid under pressure from the usual main reservoir 15, through pipe 16 and passage 17, and the usual feed valve device 18 is provided which supplies fluid at a reduced pressure to pipe 19 and a passage 20, leading to the seat of rotary valve 3.

According to my invention, an additional equalizing discharge valve mechanism is provided comprising a casing 21 containing a piston 28, having the chamber 22 at one side of the piston connected through pipe 23 with the equalizing reservoir 8 and having the chamber 24 at the opposite side connected through passage 26 and pipe 27 to the brake pipe 13. The piston 28 is adapted to operate a discharge valve 29, for venting fluid from the brake pipe. The piston 28 is preferably, though not necessarily, subject to the pressure of a coil spring 30, tending to urge the valve 29 to its seat.

In operation, with the brake valve handle 4 in the usual running position, the passage 20 from the feed valve device 18 is connected through cavity 31 in the rotary valve 3 with passage 12, so that the brake pipe is maintained charged at the standard pressure carried in the brake pipe. Passage 12 is also connected to chamber 6, through cavity 32 in the rotary valve 3 and passage 10, so that chamber 6 and the equalizing reservoir 8 are charged with fluid at brake pipe pressure.

When it is desired to effect a service reduction in brake pipe pressure, the brake valve handle 4 is turned to service application position, in which a cavity 33 in the rotary valve 3, as shown in Fig. 2, connects passage 9 with exhaust port 34.

Fluid under pressure is then vented from chamber 6 and the equalizing reservoir 8 and also from chamber 22 of the additional equalizing discharge valve mechanism 21. When the desired reduction in pressure has been effected, the brake valve handle 4 is turned to lap position, as is usual.

The reduction in fluid pressure in chamber 6 causes the equalizing piston 5 to be shifted by the higher brake pipe pressure in chamber 11, so that the discharge valve 14 is unseated to permit fluid under pressure to be vented from the brake pipe 13.

If there is a sufficient reduction in pressure in the equalizing reservoir 8, such as to permit the brake pipe pressure in chamber 24 to overcome the pressure of spring 30 and the equalizing pressure in chamber 22, the additional equalizing piston 28 will be actuated to unseat the discharge valve 29, so that the valve 29 as well as the valve 14 operate to discharge fluid from the brake pipe.

It will thus be seen that with a light reduction in equalizing reservoir pressure, only the equalizing piston 5 will be actuated, and the equalizing discharge mechanism having the piston 5 will operate as the usual discharge mechanism would operate. If a heavier reduction in equalizing reservoir pressure is made, then both discharge mechanisms will operate, so that a more rapid rate of reduction in brake pipe pressure is obtained. At the same time, the gradual closing action of a single discharge mechanism is retained, since each of the discharge valves 14 and 29 acts independently, in so far as the closing action is concerned.

It is possible to dispense with the spring 30, in which case, the desired action is obtained, due to the fact that there will always be differences in the functional resistance to movement of two equalizing discharge valve devices, so that one will move before the other, both in opening and closing. I prefer, however, to employ the spring, as this provides a more positive means for ensuring the serial action of the discharge valve devices.

Cut out cocks 35 and 36 may be placed in the respective pipes 23 and 27, so that when desired to cut the additional equalizing discharge valve mechanism out of action, the cocks may be operated to cut off communication through said pipes to the additional equalizing discharge valve mechanism. When the additional equalizing discharge valve mechanism is cut out of action, the discharge of fluid under pressure from the brake pipe is controlled solely by the discharge valve mechanism, which is directly associated with the brake valve device.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake apparatus, the combination with a brake pipe, an equalizing reservoir, and an equalizing discharge valve mechanism subject to the opposing pressures of the brake pipe and the equalizing reservoir for controlling the venting of fluid from the brake pipe, of an additional equalizing discharge valve mechanism subject to the opposing pressures of said brake pipe and said equalizing reservoir for also controlling the venting of fluid from the brake pipe.

2. In a fluid pressure brake apparatus, the combination with a brake pipe, an equalizing reservoir, a valve for venting fluid under pressure from the brake pipe, and a piston subject to the opposing pressures of the brake pipe and the equalizing reservoir for operating said valve, of an additional valve for also venting fluid from the brake pipe and an additional piston subject to the opposing pressures of said brake pipe and equalizing reservoir for operating said additional valve.

3. In a fluid pressure brake apparatus, the combination with a brake pipe, an equalizing reservoir, a valve for venting fluid under pressure from the brake pipe, and a piston subject to the opposing pressures of the brake pipe and the equalizing reservoir for operating said valve, of an additional valve for also venting fluid from the brake pipe, a spring, and an additional piston, subject on one side to the pressure of the equalizing reservoir and said spring and on the opposite side to brake pipe pressure, for operating said additional valve.

In testimony whereof I have hereunto set my hand, this 6th day of February, 1930.

JOSEPH C. McCUNE.